United States Patent
Sandoi et al.

(10) Patent No.: US 9,992,696 B2
(45) Date of Patent: Jun. 5, 2018

(54) METHOD OF ESTIMATING BER VALUES IN A WIRELESS COMMUNICATION SYSTEM

(71) Applicants: Bodgan-Mihai Sandoi, Bucharest (RO); Andrei-Alexandru Enescu, Bucharest (RO)

(72) Inventors: Bodgan-Mihai Sandoi, Bucharest (RO); Andrei-Alexandru Enescu, Bucharest (RO)

(73) Assignee: NXP USA, Inc., Austin, TX (US)

( * ) Notice: Subject to any disclaimer, the term of this patent is extended or adjusted under 35 U.S.C. 154(b) by 135 days.

(21) Appl. No.: 14/913,858

(22) PCT Filed: Aug. 29, 2013

(86) PCT No.: PCT/IB2013/058120
§ 371 (c)(1),
(2) Date: Feb. 23, 2016

(87) PCT Pub. No.: WO2015/028843
PCT Pub. Date: Mar. 5, 2015

(65) Prior Publication Data
US 2016/0212644 A1    Jul. 21, 2016

(51) Int. Cl.
*H04W 24/08*    (2009.01)
*H04L 1/20*     (2006.01)
*H04L 12/26*    (2006.01)

(52) U.S. Cl.
CPC .............. *H04W 24/08* (2013.01); *H04L 1/203* (2013.01); *H04L 43/0847* (2013.01)

(58) Field of Classification Search
None
See application file for complete search history.

(56) References Cited

U.S. PATENT DOCUMENTS 5,214,687 A    5/1993   Kansakoski et al.
6,848,065 B1   1/2005   Nilsson
(Continued)

FOREIGN PATENT DOCUMENTS

WO    2004-073244 A1    8/2004

OTHER PUBLICATIONS

Baker et al, "Bit error rate estimation in UMTS in the absence of an amplitude reference", IEEE 16th International Symposium on Personal, Indoor and Mobile Radio Communications, Sep. 11-14, 2005, pp. 1662-1666, vol. 3.

(Continued)

*Primary Examiner* — Chi H Pham
*Assistant Examiner* — Raul Rivas

(57) ABSTRACT

There is provided a method of estimating a bit error rate in a transport channel of a wireless communication system. The method comprises the receiving a signal from a remote transmitter of the wireless communication system via a physical channel, the signal comprising data and noise forming a plurality of soft bits. The method further comprises the counting, during a period of time, a number of erroneous bits being those soft bits which have an amplitude below −2A or above +2A with A being the average amplitude of the soft bits received. Next, the number of erroneous bits is divided by a number of total bits received during said period of time in order to obtain the bit error rate. This method provides a way to estimate the BER value without knowing the exact shape of the noise distribution. In an embodiment a selection is made between two estimation algorithms.

13 Claims, 9 Drawing Sheets

(56) References Cited

U.S. PATENT DOCUMENTS

| | | | |
|---|---|---|---|
| 7,016,330 B2 | 3/2006 | Pietraski et al. | |
| 2003/0142727 A1 | 7/2003 | Monogioudis et al. | |
| 2005/0022077 A1 | 1/2005 | Ohlen | |
| 2005/0075103 A1* | 4/2005 | Hikokubo | H04L 1/0003 455/423 |
| 2007/0162788 A1 | 7/2007 | Moelker | |
| 2010/0284443 A1 | 11/2010 | Rosenqvist et al. | |
| 2013/0114401 A1* | 5/2013 | Martin | H04L 1/0001 370/225 |
| 2013/0122842 A1 | 5/2013 | Elfstrom | |
| 2013/0311840 A1* | 11/2013 | Miyata | G06F 11/076 714/704 |

OTHER PUBLICATIONS

International Search Report for the International application No. PCT/IB2013/058120 dated May 27, 2014.

* cited by examiner

METHOD OF ESTIMATING BER VALUES IN A WIRELESS COMMUNICATION SYSTEM

FIELD OF THE INVENTION

This invention relates to a method of estimating a bit error rate in a transport channel of a wireless communication system. It also relates to a network node of a wireless communication network, and a mobile communication device arranged to perform the method. It also relates to a computer program product.

BACKGROUND OF THE INVENTION

Bit error rate (BER) estimation of transport channels is a measure of transport channel quality, based on which the Radio Access Network could take actions to improve the quality of certain transport channels if needed. The 3GPP standards contain strict requirements for such estimations. Below in table 1, one of the requirements taken from the 3GPP standard 25.215 is listed.

TABLE 1

| | |
|---|---|
| Definition | The transport channel BER is an estimation of the average bit error rate (BER) of the DPDCH data of a Radio Link Set. The transport channel (TrCH) BER is measured from the data considering only non-punctured bits at the input of the channel decoder in Node B. It shall be possible to report an estimate of the transport channel BER for a TrCH after the end of each TTI of the TrCH. The reported TrCH BER shall be an estimate of the BER during the latest TTI for that TrCH. |

The average of consecutive Transport channel BER measurements is required to fulfil the accuracy stated in table 2 below if the total number of erroneous bits during these measurements is at least 500 and the absolute BER value for each of the measurements is within the range given in the table 2.

TABLE 2

| Parameter | Unit | Accuracy [% of the absolute BER value] | Conditions Range |
|---|---|---|---|
| TrpBER | — | +/−10 | Convolutional coding $1/3^{rd}$ with any amount of repetition or a maximum of 25% puncturing: for absolute BER value ≤15% Convolutional coding ½ with any amount of repetition or no puncturing: for absolute BER value ≤15% Turbo coding $1/3^{rd}$ with any amount of repetition or a maximum of 20% puncturing: for absolute BER value ≤15%. |

At present two main methods of doing the BER measurement are known: a so-called straight forward (brute force) method and a SNR to BER conversion technique. The straight forward method exploits the fact that the data, for which the BER is measured, is coded using error correction codes. By decoding this data, the errors or part of the errors will be corrected. Having the corrected decoded data, it can be re-encoded and used as reference to detect the erroneous bits. This method requires re-encoding to be performed which is very computationally intensive. Furthermore, the point of measurement is after the Decoding stage. This has larger latency. Also the performance of the estimate is dependent of the used decoder.

The SNR to BER conversion method estimates the BER exploiting the correlation between SNR, BER and the shape of the distribution of noise. It comprises 2 main stages: estimating the SNR and next translating the SNR to BER. The translation from SNR to BER can be deduced when the shape of the noise distribution is known. The main disadvantage of this method is that it assumes that the noise distribution is known in order to do the conversion. This is not always possible in real case scenarios.

SUMMARY OF THE INVENTION

The present invention provides a method of estimating a BER as described in the accompanying claims. It also provides a network node of a wireless communication network, and a mobile communication. It also provides a computer program product.

Specific embodiments of the invention are set forth in the dependent claims.

These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. Elements in the figures are illustrated for simplicity and clarity and have not necessarily been drawn to scale.

Elements in the figures are illustrated for simplicity and clarity and have not necessarily been drawn to scale. In the Figures, elements which correspond to elements already described may have the same reference numerals.

DETAILED DESCRIPTION OF THE PREFERRED EMBODIMENTS

Figure 1:
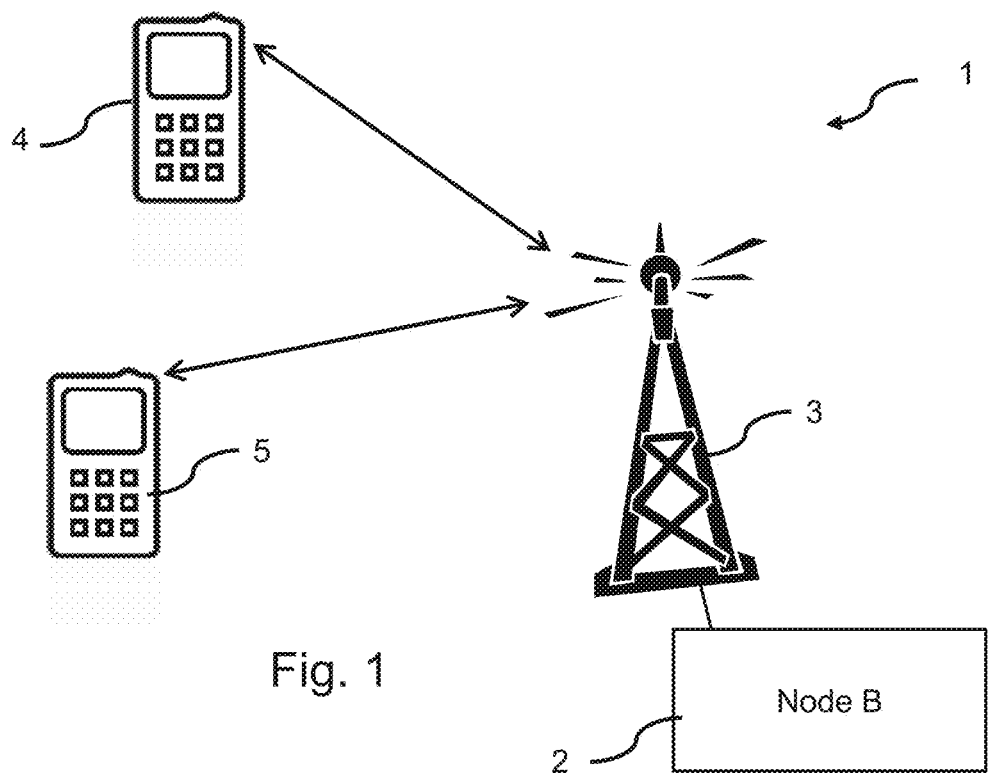
FIG. 1 shows an example of part of a wireless communication system in which some of the embodiments could be implemented.

FIG. 1 shows an example of part of a wireless communication system in which some of the embodiments could be implemented. The system comprises a base station 2 and an antenna 3 for communication between the base station 2 and mobile communication devices, two of which are shown in the example of FIG. 1, see references 4, 5. The mobile communication devices 4, 5 could be mobile telephones or any other user equipment (UE) arranged to communicate with or via the base station 2. Wireless communication between the UE 4, 5 (also referred to as users) and the base station 2 can be established using known techniques such as 3G, HSDPA or HSPA (plus).

One of the air interface standards developed by 3GPP is WCDMA—Wideband Code Division Multiple Access. It is air interface which uses code division multiple access as a channel access method, in which multiple sources (users) can transmit simultaneously on the same frequency band. There are two main parts of this technique. The first is called Spreading. Due to spreading the signal is transmitted with a higher bandwidth (with a higher bit rate). The bit rate before spreading is N, after spreading it will be SF*N, where SF is the spreading factor, and the term 'chip rate' is used, so: Chip Rate=SF*BitRate. To obtain this chip rate, instead of transmitting a bit, the spreading code is transmitted, multiplied by that bit. The Spreading Codes are orthogonal between them, so different data sent with different spreading codes can be retrieved by the inverse operation of dispreading.

The second part of the WCDMA technique is called scrambling in which the obtained chip data, obtained after the spreading process, is multiplied with a pseudo-random code.

In the Downlink direction, i.e. from the base station 2 of FIG. 1 to the User Equipment 4, 5, the Scrambling Codes differentiate transmissions from different base stations. The Spreading Codes differentiate transmissions to different users, from the same base station 2. In the Uplink direction, i.e. from the User Equipment 4, 5 to the base station 2, the Scrambling Codes differentiate different users while the Spreading Codes differentiate different transmissions from the same user.

In a WCDMA L1 Uplink Flow multiple users transmit data in parallel using the same frequency band. Each user transmits data entities called transport blocks which are transmitted over transport channels (TrCh). A user can transmit data using one or more transport channels.

Figure 2:
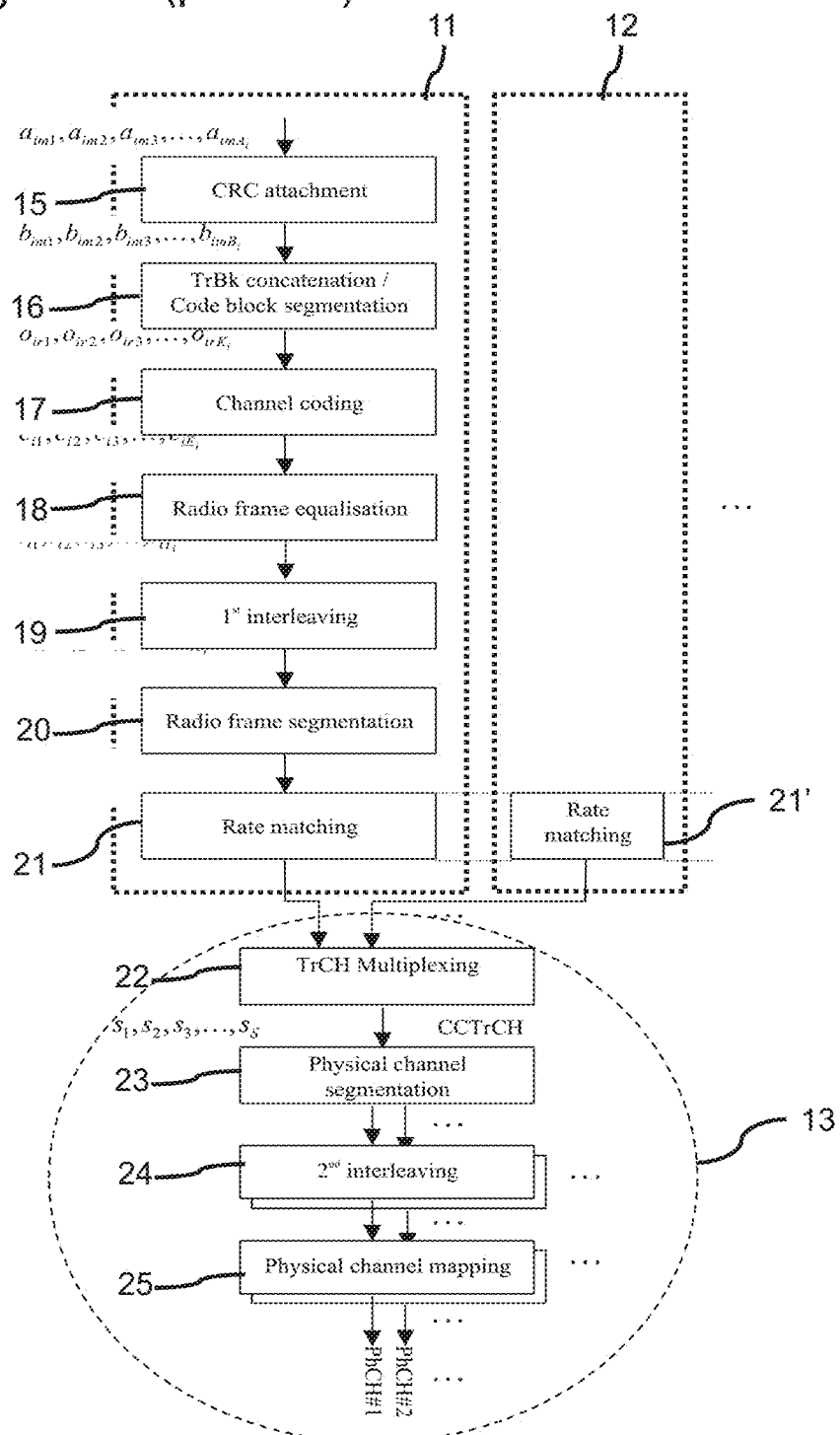
FIG. 2 shows a flow chart of an Uplink processing flow of a single user according to the state of the art.

Multiple transport channels from the same user are multiplexed together and form a Coded Composite Transport Channel, which is mapped onto one or multiple Physical Channels. FIG. 2 shows a flow chart of an Uplink flow of a single user according to the state of the art. This example is taken from the 25.212 3GPP standard. We can divide the processing at the transmitter (i.e. the UE) into two parts: transport channel coding (for each transport channel), see TrCh 11, 12 and Coded Composite Transport Channel Coding, see the dotted circle 13. At the receiver (i.e. the base station 2), the inverse process takes place (flow goes from bottom to top), which will be discussed later on with reference to FIG. 3. As is shown in FIG. 2 the Uplink flow at the UE 4,5 comprises a CRC attachment step 15 followed by a Transport Block concatenation/Code block segmentation step 16. Next a Chanel coding step 17 is performed followed by a radio frame equalisation step 18. Next a first interleaving step 19 is performed followed by a Radio frame segmentation step 20. The output of the Radio frame segmentation step 20 is input for a Rate matching step 21. As is shown in FIG. 2, each Transport Channel ends with a Rate matching step, see also the last step 21' of the transport channel 12.

The result of all the Rate matching of the transport channels is processed in a TrCh multiplexing step 22. Next a physical channel segmentation is performed, see step 23 and a second interleaving step 24 is performed. At the end of the Coded Composite Transport Channel Coding, a physical channel mapping is done, see step 25. After the physical channel mapping the data is transmitted over one or more physical channels PhCH#1, PhCH#2 PhCH#N to the base station 2.

Figure 3:
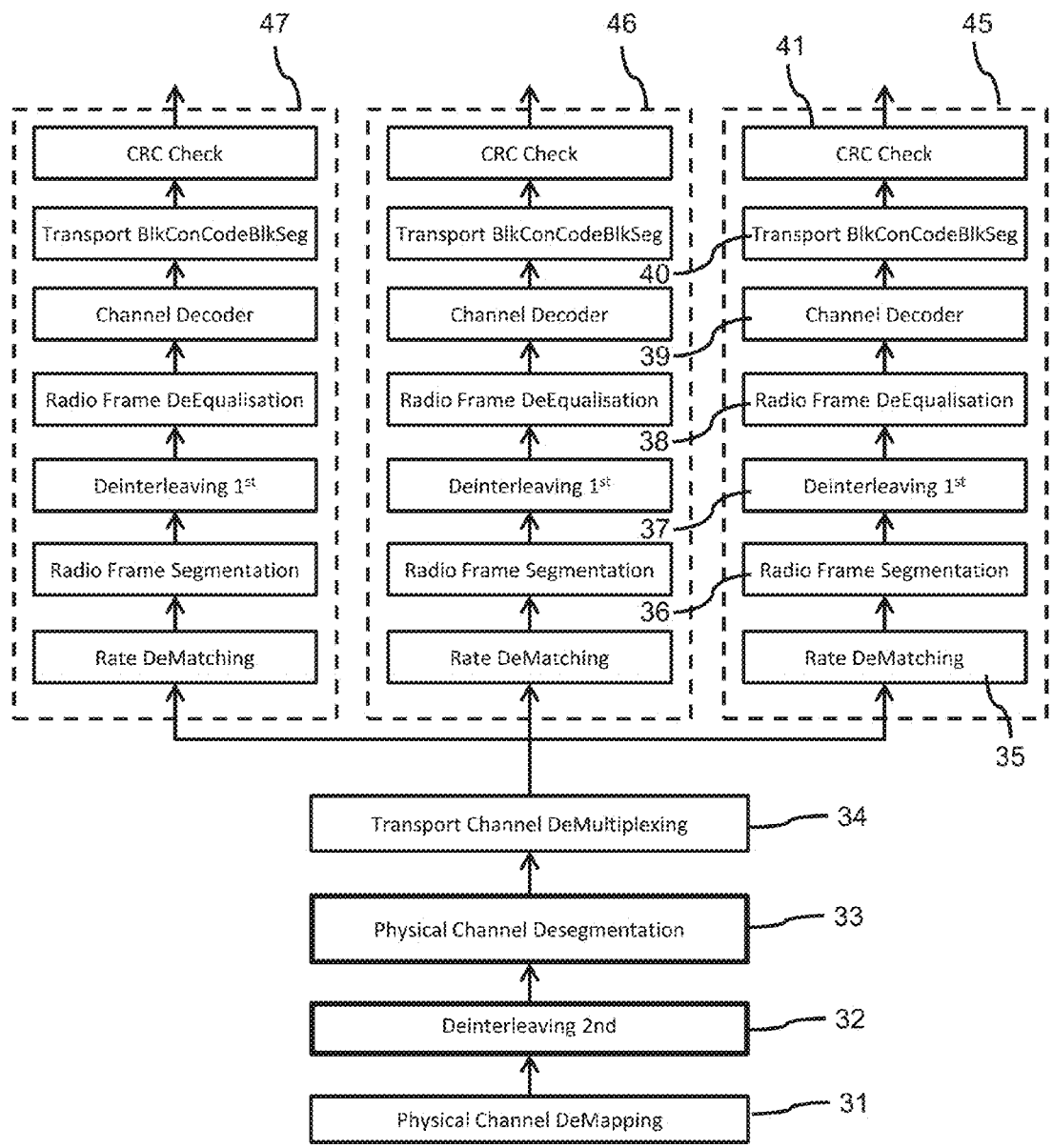
FIG. 3 shows an example of an Uplink processing flow at the base station according to the state of the art.

FIG. 3 shows an example of an Uplink flow at the base station 2 according to the state of the art. The flow starts at the bottom with a step Physical Channel DeMapping 31 followed by a Deinterleaving step 32. Next a Physical channel desegmentation is performed, see step 33, and next a transport channel Demultiplexing, see step 34. For each transport channel 45, 46, 47 further steps follow, starting with a Rate DeMatching step 35. Followed by a Radio Frame Segmentation step 36. Which is followed by a Deinterleaving step 37. Then a Radio Frame DeEqualisation step 38 is performed. And next, a Channel decoding step 39 is performed. After the channel decoding step 39 a step 40 follows. Finally at the top of the flow chart, a CRC Check is performed.

It is noted that the rate Matching steps 21, 21' at the user, see FIG. 2, can influence the measured values of transport channel BER at the base station 2. A fixed number of bits, X, can be transmitted in the same time over the air. The number Y of bits after Radio frame segmentation step, see step 21, might not be exactly X. We will denote:

$$Y = \sum_{i=1}^{Num\ of\ TrChs} Y_i$$

$Y_i$=Number of bits before rate matching on transport channel i

Y=total number of bits on all transport channels before rate matching Num of TrChs=the number of transport channels Different cases are possible:

Y=X: the Rate Matching step is transparent,

Y>X: Puncturing; there are more bits than can be transmitted, some of the bits are punctured (not transmitted). This is possible because the transmitted data has redundancy given by the Channel Coding Stage.

Y<X: Repetition; there are less bits then the total number of bits that can be transmitted. In this case some of the bits will be repeated to increase the redundancy. At the receiver, because some bits were repeated, after the Rate DeMatching step 35, they could be combined to obtain a higher SNR. This will change the shape of the distribution of noise.

Each transport channels 11, 12 has so-called Rate Matching Attributes, which gives the transport channels a weight and a priority, when puncturing or repeating bits. Transport channels with a higher weight, will have less bits punctured (%) than transport channels with lower weights in case of puncturing, or will have more bits repeated (%) than the transport channels with lower weights in case of repetition.

Figure 4:
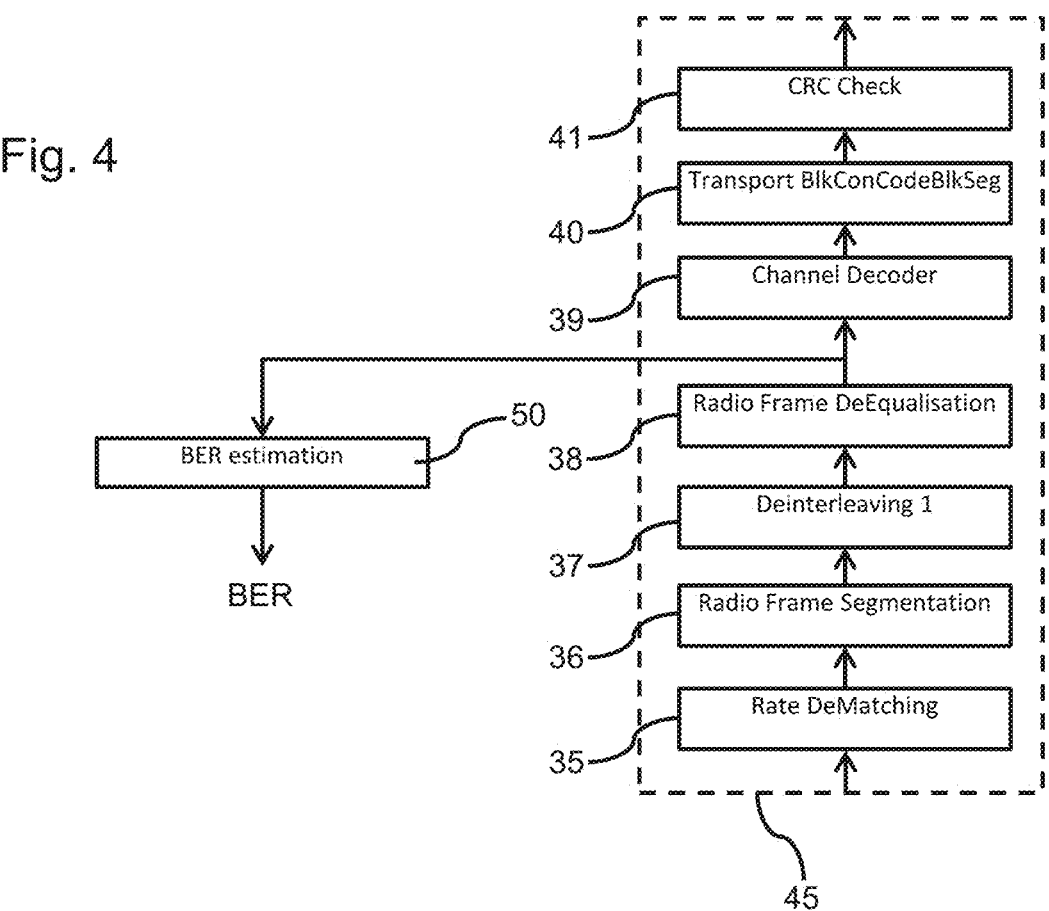
FIG. 4 shows a flow chart of an example of a signal processing chain in the transport channel decoding wherein a method of estimating a bit error rate is executed by the base station according to an embodiment.

The 3GPP standard requires the Uplink Transport Channel BER measurement to be made at the receiver (i.e. base station 2) for each user, for each transport channel, before the channel decoding step 39. FIG. 4 shows an example of a flow chart of a signal processing chain in the transport channel decoding step 45 wherein a method of estimating a bit error rate is executed by the base station 2 according to an embodiment. The output of the radio frame DeEqualisation step 38 is used in a BER estimation method 50 for estimating a BER for the transport channel 45.

In the following description the term 'Soft symbol' is used to refer to a received symbol which has been affected by a propagation channel and by noise. The term 'Soft Bit' is used to refer to a received bit which has been affected by a propagation channel and by noise. A soft bit would be the equivalent of a soft symbol in the case of binary modulation, such as in the Binary Phase-shift keying (BPSK) modulation.

In BPSK transmissions only two discrete values are sent B and −B. These are correlated with the bits to be transmitted. One possible example is: Bit "0"->Transmit signal level "B", Bit "1"->Transmit signal level "−B". It is expected at the receiver side to have a different magnitude, e.g. "A" instead of "B". However, at the receiver after demodulation we won't receive only two discrete values A and −A, but instead we will receive a range of values, called soft symbols $Y[n]=\mp A+noise$. In this case a bit error occurs if considered in the case where the sign of the received soft symbol is changed, i.e. $Sign\{Y[n]\} \neq Sign\{X[n]\}$.

Figure 6:
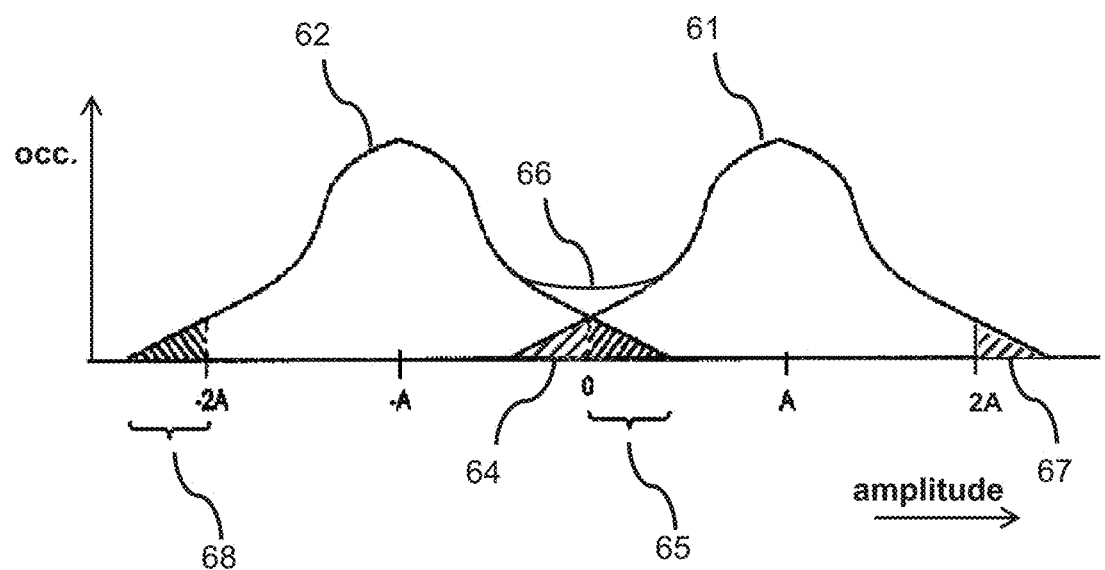
FIG. 6 shows an example of a histogram of received soft symbols.

Ideally without any noise, if the transmitter sent only B, the receiver would expect to see a histogram of the received data where all the received symbols are the same, resulting in a single peak at one point of the horizontal axis amplitude equal to A. In a real environment the transmission will encounter noise, and the distribution of the soft symbols will change because it was impacted by the noise, see line 61 of FIG. 6. FIG. 6 shows a noise distribution function 61 relating to a received soft symbol with average amplitude A, and a noise distribution function 62 relating to a received soft symbol with average amplitude −A. As can be seen from line 61, the receiver will not always get the exact same symbol due to noise. Like mentioned earlier, the part of the symbols which will change their sign due to noise will be erroneous bits, see the dashed part in region 64. A counter part of erroneous bits is found in region 65. The distributions shown in FIG. 6 have Gaussian forms. This is a common distribution to be expected in wireless systems. Because the distributions 61 and 62 overlap in the regions 64 and 65, the number of occurrences within those amplitude ranges are a result of adding curve 61 to curve 62. This means that the number of occurrences in the dashed regions 64 and 65 cannot be measured. However, when assuming that both the distributions 61 and 62 are symmetrical distributions, the areas below the line 61 in the region 64 equals the area below the line 61 in region 67. And in a similar way it can be concluded that the areas below the line 62 in the region 65 equals the area below the line 62 in region 68. So without being able to measure the erroneous bits, it is possible to make an estimate on the number of those bits by counting the number of occurrences in the regions 67 and 68.

Figure 5:
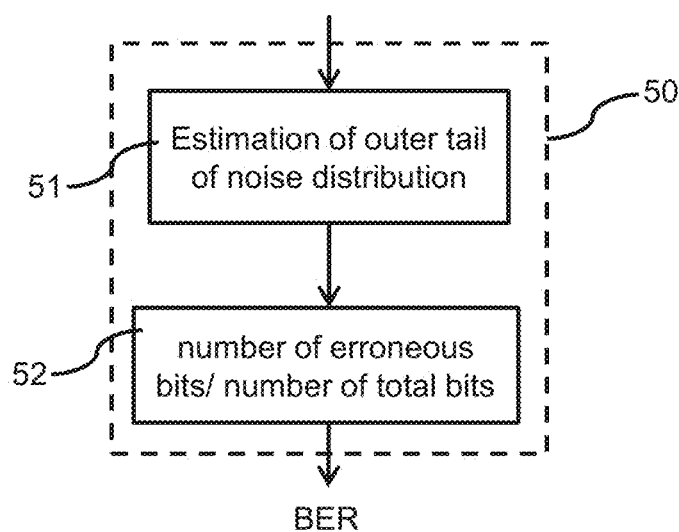
FIG. 5 shows a flow chart for an embodiment of the estimation method.

In an embodiment, the above assumptions are used to estimate a BER for a specific transport channel, see FIG. 5. The method comprises a first step 51 of estimating the occurrences in the outer tails of the noise distributions 61, 62. The estimation is done by counting, during a period of time, a number of erroneous bits being the number of soft bits having an amplitude below −2A or above +2A with A being the average amplitude of the soft bits received from a remote transmitter sending a positive discrete value B. And a second step 52 comprises dividing the number of erroneous bits by the number of total bits received during the period of time in order to obtain the bit error rate. In an embodiment the counting is performed during a Transmission Time Interval (TTI), but other time periods are conceivable. In the description below, the method step 51 and 52 are also referred to as Algorithm 2.

Figure 7:
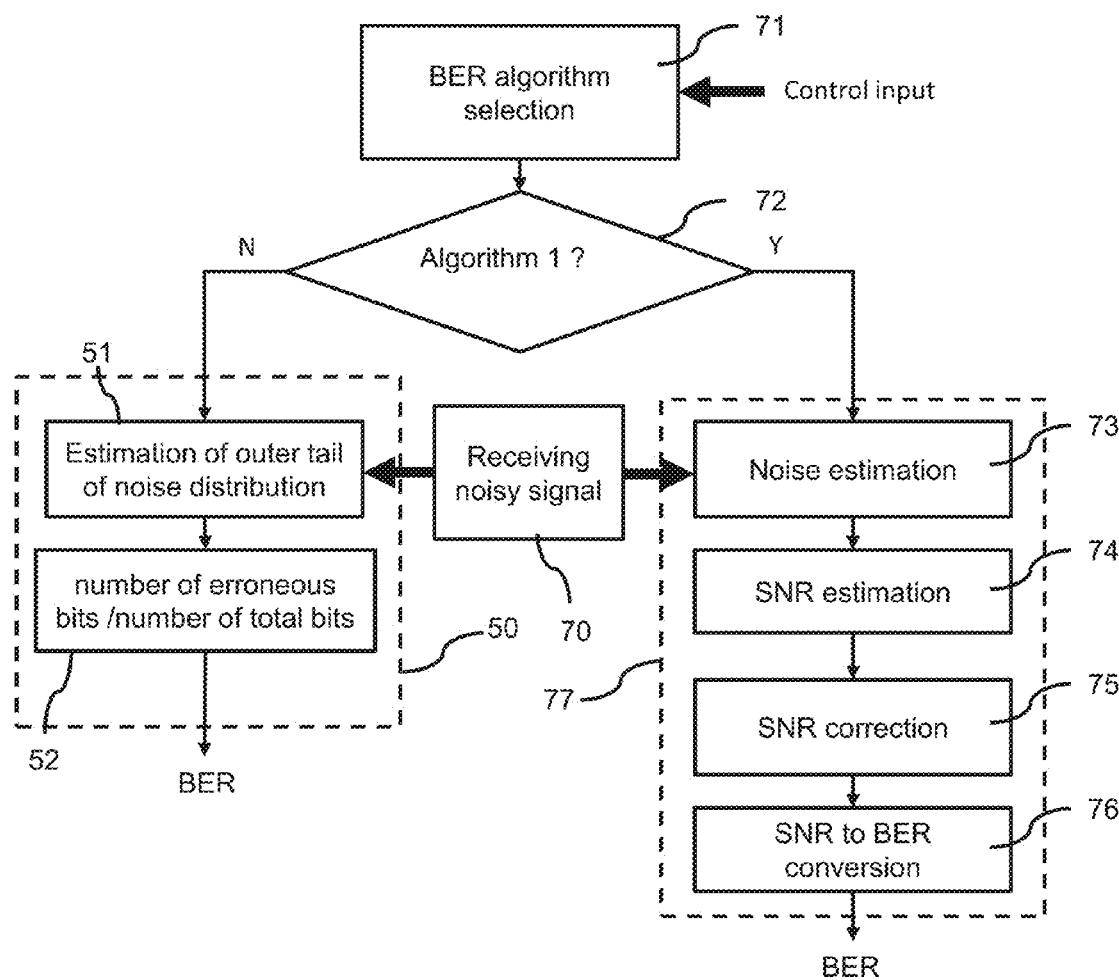
FIG. 7 shows a flow chart for a further embodiment of the estimation method.

In an embodiment the method of estimating the BER in a transport channel comprises an alternative sequence of method steps to estimate the BER, using a different algorithm, referred to as Algorithm 1. Algorithm 1 will be discussed with reference to FIG. 7, see the dashed box 77. As is shown in FIG. 7, the method of estimating the BER comprises a receiving step 70 in which a signal is received from the remote transmitter 4,5 of the wireless communication system via the physical channel, at the transport channel decoding 45, the signal comprising data and noise forming a plurality of soft bits. The method further comprises an algorithm selection step 71 for selecting Algorithm 1 or Algorithm 2 depending on at least one channel parameter, this parameter may be for example the spreading factor SF of the physical channel(s), upon which the transport channel(s) were transmitted. In the selection step 71 a condition is evaluated using the control input data (i.e. the physical and/or transport channel parameters). An example of the condition is: SF>=32.

If the condition is met, the method continues to algorithm 1 starting with a step 73, in which a bit value decision is performed for each soft bit received during the period of time, by making a hard decision upon received soft bits, to render estimated data. The estimated data is subtracted from the soft bits to render a noise (power) estimate. In a next step 74 an SNR estimation value is calculated using the formula $$SNRest = \frac{P_{signal}}{P_{noise}} \cong \frac{A^2}{\frac{1}{N}\sum_{i=1}^{N} noise(i)^2} = \frac{NA^2}{\sum_{i=1}^{N} noise(i)^2}$$

with $P_{signal}$ the power of the signal, $P_{noise}$ the power of the noise

N the number of samples used in the estimation

A the average signal amplitude noise(i) the $i^{th}$ sample of noise.

In a next step 75, the SNR estimation value is improved by removing a systematic error which was introduced in the SNR estimation block 74, to render an improved SNR estimation value. The improved SNR estimation value is converted to a BER value in a step 76 based on an analytical relation between the improved SNR estimation value and the BER.

If step 72 shows that the condition is not met, the method steps 51 and 52 of Algorithm 2 are executed. As is shown in FIG. 7 both steps 51 and 73 receive as input the soft symbols, so the symbols sent plus the noise caused by the telecommunication channels.

Figure 8:
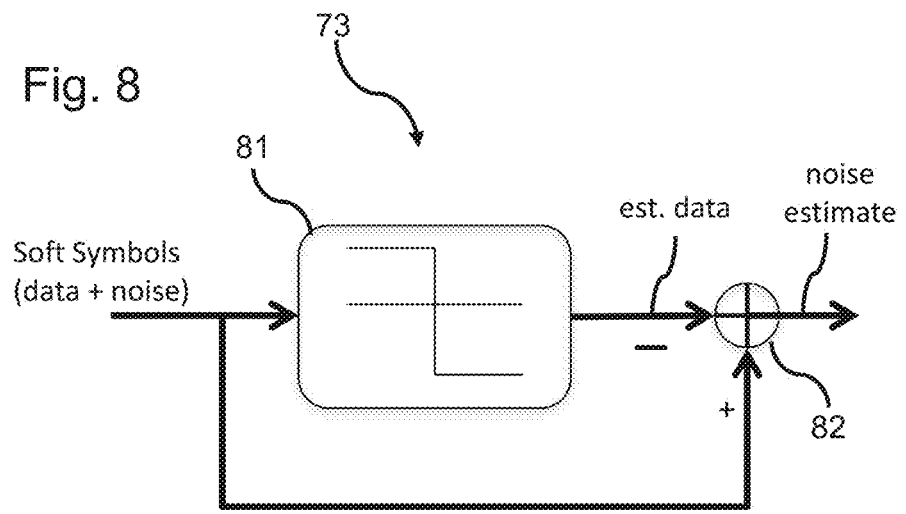
FIG. 8 shows a possible implementation of the noise estimation step/block.

FIG. 8 shows a scheme of an example of an implementation of the determining of the noise power estimate of the received soft bits. The received soft bits are input for a slicer block 81 in which a hard decision is made upon the input samples (i.e. soft bits), to render estimated data. At block 82 the estimated data is subtracted from the soft bits to render the noise estimate. This noise estimate is then used in the following step 74 described above, see FIG. 7.

Figure 9:
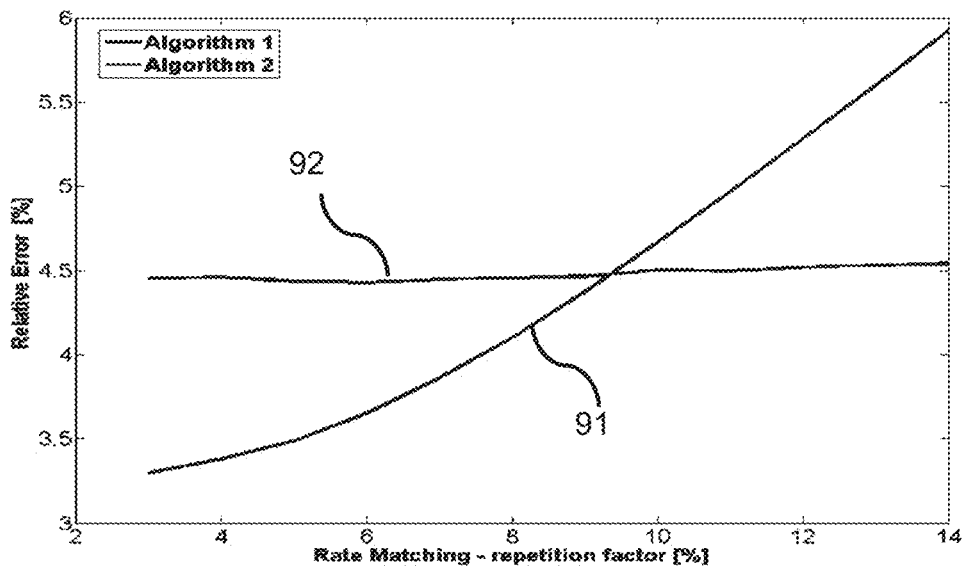
FIG. 9 shows test results of the relative error as a function of the repetition factor for both the Algorithm 1 and Algorithm 2.

FIG. 9 shows test results of the relative error as a function of the repetition factor for both the Algorithm 1, see line 91, and Algorithm 2, see line 92. The relative error is defined by:

$$\text{Relative Error} = \frac{|\text{Estimated } BER - \text{Real } BER|}{\text{Real } BER} * 100,$$

As can be seen from FIG. 9, the performance of Algorithm 1 depends on the repetition factor while Algorithm 2 performs roughly the same if the repetition factor changes. So in order to further improve the method of estimating the BER, according to an embodiment the BER is estimated using Algorithm 1 or Algorithm 2 depending on physical and/or transport channel parameters, including a repetition factor.

Figure 10:
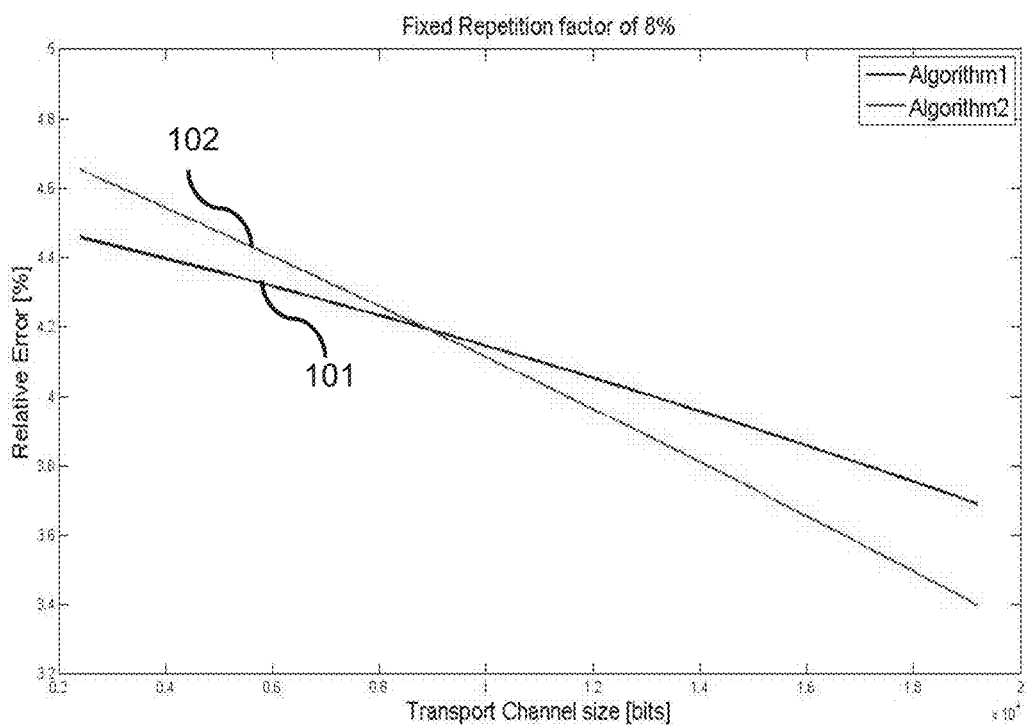
FIG. 10 shows test results of the relative error as a function of the Transport channel size for both the Algorithm 1 and Algorithm 2.

FIG. 10 shows test results of the relative error as a function of the Transport channel size for both the Algorithm 1, see line 101, and Algorithm 2, see line 102. As can be seen from FIG. 10, in this example Algorithm 1 is preferred when the transport channel size is below about $0.9 \times 10^4$ bits.

Figure 11:
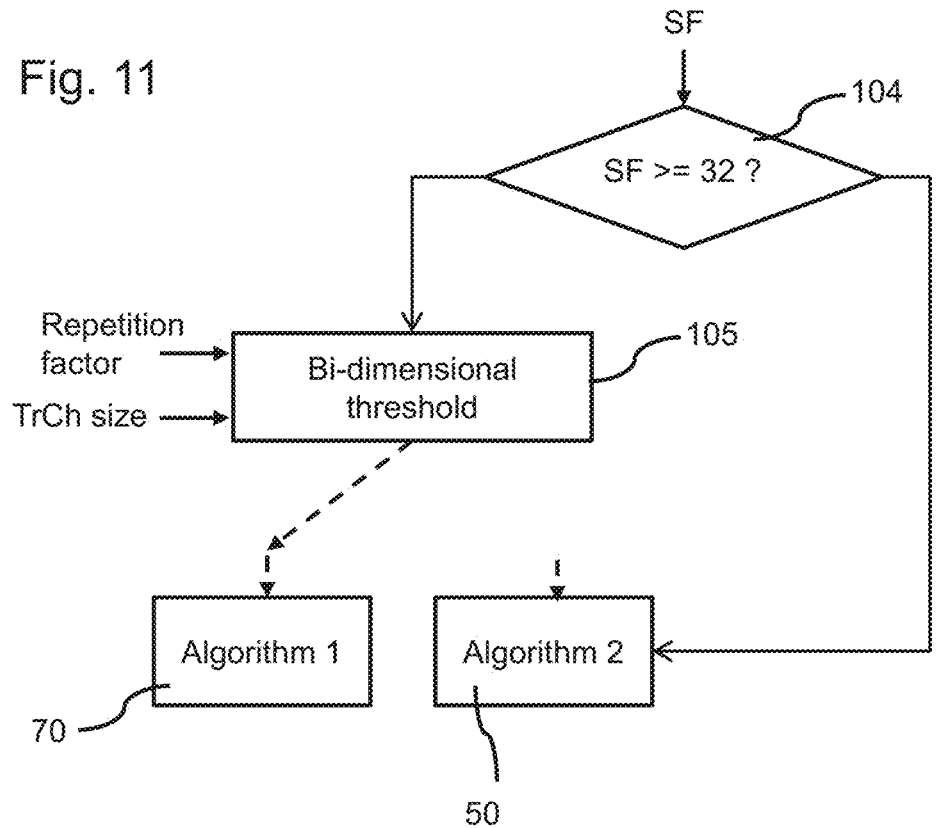
FIG. 11 shows a possible implementation of an algorithm selection step.

FIG. 11 shows a possible implementation of the algorithm selection step 71. The algorithm selection block 71, each time a transport channel BER measurement is made, selects which of the two above algorithms will be used.

In the implementation of FIG. 11, the decision logic is as following:
for spreading factors SF greater or equal to 32 it is assumed that the noise before the Rate DeMatching stage/step 35 has a Gaussian form (due to the Central limit theorem), in this situation a bi-dimensional threshold, see block 105, is used to select between the two algorithms,
for spreading factor SF less than 32, the Algorithm 2 is used. In this case it is unknown whether the noise distribution is near Gaussian, so Algorithm 2 is preferred.

It is noted that other values for SF could be used. Possible SF values in WCDMA are $2^x, x=1 \ldots 8$, so SF=2,4,8,16,32,64,128,256.

Figure 12:
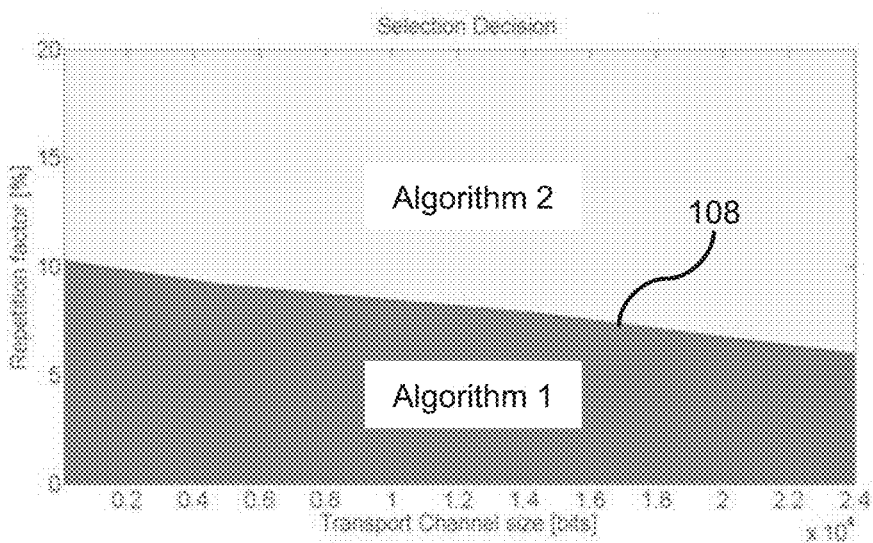
FIG. 12 shows an example of the function F as a result of an empirically study for calculating the bi-dimensional threshold based on the repetition factor and the transport channel size in the case of Gaussian noise at the input.

In an embodiment, the Algorithm 1 is selected if the spreading factor is equal or higher than the predefined threshold, e.g. 32 and if TrCh_size is smaller than a function F(repetition factor) with F being a function of the repetition factor. FIG. 12 shows an example of the function F, see line 108, which line was a results of an empirically study for calculating the bi-dimensional threshold based on the repetition factor and the transport channel size in the case of Gaussian noise at the input. In an embodiment the checking if the condition is met (and thus Algorithm 1 selected) comprises accessing a lookup table with as input parameters the repetition factor value and the transport channel size value, to render an output parameter indicating whether the condition is met or not (i.e. which algorithm to use). The output parameter could be a Boolean value, a digital value, or it could be a parameter representing algorithm 1 or algorithm 2.

Prior art methods of estimating the BER are based on a translation from SNR to BER. They are based on knowing the shape of the noise distribution. They cannot compute the BER without estimating the SNR, as happens with Algorithm 2, presented previously. Knowing the noise distribution shape is not always true. The shape of the distribution will vary depending on the number of active users, SF, Rate Matching Parameters. In this case applied at TrCh level, prior art methods will perform poorly. The Algorithm 2 presented works even without knowing the exact shape of the distribution. The proposed method brings a high accuracy estimate even in the cases where prior art methods would perform poorly.

In most prior art systems decoding needs to be performed. As a result those estimation methods are decoder dependent. WCDMA uses two types of different decoders: Viterbi and Turbo Decoders. The proposed methods described above are decoder independent. They can be implemented not taking into account the decoder implementation/performance; they have lower latency because it gives the results before the decoding has finished.

The method described above may be used for measuring the BER as part of the standard requirements for WCDMA L1, Uplink Flow. It can be included in the WCDMA L1 software for NodeBs. It is not limited only to Small Cells, it can be used in any type of cell: small, metro, macro etc. The method could be used on any WCDMA L1 software for NodeB. The method could also be used with other communication types using BPSK or QPSK. For instance it could be used in some cases of LTE BER estimation (e.g. PUSCH with QPSK modulation) and some cases of WCDMA Downlink BER estimation, done by the User equipment 4, 5 depicted in FIG. 1.

So according to an embodiment there is also provided a network node 2 of a wireless communication network, such as the NodeB 2 of FIG. 1, arranged to perform the method as described above. The network node may be arranged to receive the soft symbols and process them as described with reference to FIG. 3. The network node 2 may be a Node B or an EnodeB (for the LTE case).

Figure 13:
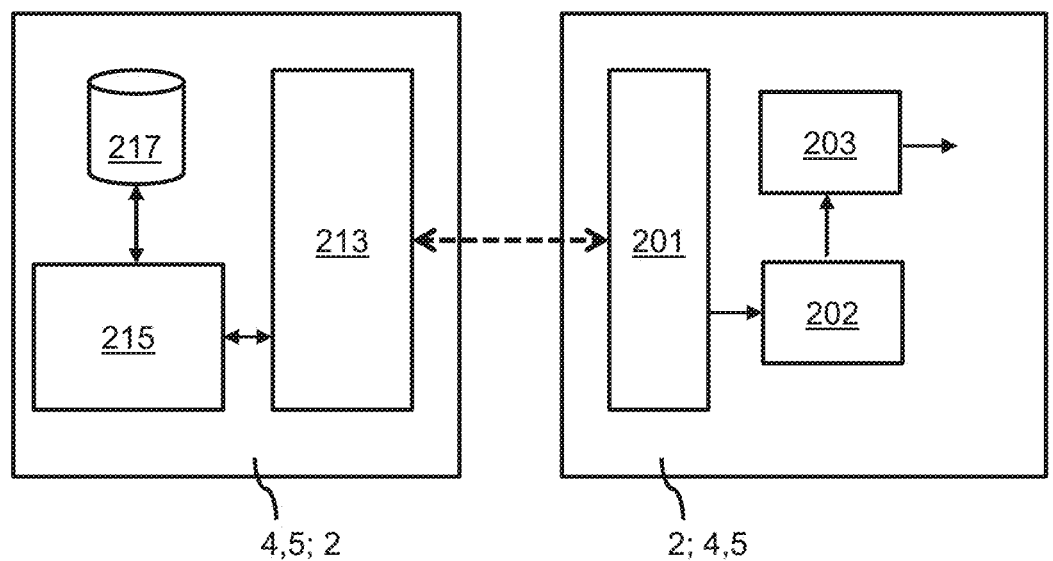
FIG. 13 schematically shows an exemplary embodiment of a network node in communication with a mobile telecommunication device.

FIG. 13 shows an embodiment of the network node 2. The network node comprises a receiver 201 for receiving a signal from a remote transmitter 4, 5 of the wireless communication system via physical channel(s) FIG. 3, which eventually get to be demapped onto one or more transport channels. Please note that the Flow here is: One/Multiple Physical Channels->One Coded Composite Transport Channel->One/Multiple Transport Channels.

As described above, the received signal comprises data and noise forming a plurality of soft bits. The network node 2 further comprises a counter 202 for counting, during a period of time, a number of erroneous bits being those soft bits out of the plurality which have an amplitude below −2A or above +2A with A being the average amplitude of the soft bits received via said physical channel, at the transport channel decoding 45. The network node 2 also comprises a divider 203 for dividing the number of erroneous bits by a number of total bits received via the transport channel during the period of time in order to obtain the bit error rate. The error bit rate may then be used by the upper layers in order to take actions to improve the quality of certain transport channels if needed.

The remote transmitter 4, 5 in FIG. 13 may be a mobile phone 4, 5 comprising a transceiver 213, a processor 215 and a memory 217. Instead of the method of estimating being implemented on the network node side, the method may alternatively be implemented on the mobile device side.

Thus according to a further embodiment there is provided a mobile communication device, such as the UE 4, 5 of FIG. 1, wherein the device is arranged to perform the method as described above. The UE 4, 5 may be a mobile phone or some other communication device using communications techniques such as WCDMA (3G). FIG. 13 shows an embodiment of the mobile communication device 4, 5. The communication device may comprise a receiver 201 for receiving a signal from a remote transmitter, e.g. the network node 2, of the wireless communication system via the physical channel FIG. 3, a transport channel decoding 45. As described above, the received signal comprises data and noise forming a plurality of soft bits. The communication device 4,5 further comprises a counter 202 for counting, during a period of time, a number of erroneous bits being those soft bits out of the plurality which have an amplitude below $-2A$ or above $+2A$ with A being the average amplitude of the soft bits received via said transport channel 45. The communication device 4, 5 also comprises a divider 203 for dividing the number of erroneous bits by a number of total bits received via the physical channel during the period of time in order to obtain the bit error rate.

Figure 14:
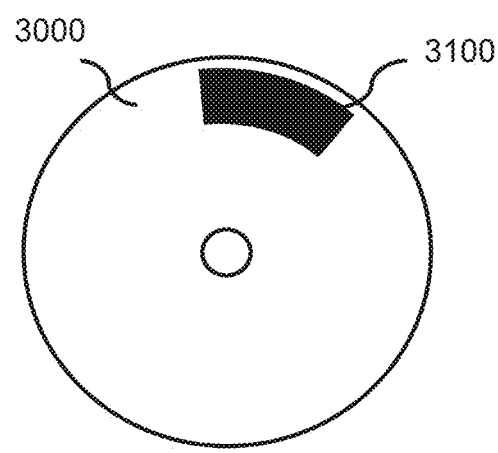
FIG. 14 shows a computer readable medium comprising a computer program product.

FIG. 14 shows a computer readable medium 3000 comprising a computer program product 3100, the computer program product 3100 comprising instructions for causing a processor apparatus to perform a method of estimating the BER as described above. The computer program product 3100 may be embodied on the computer readable medium 3000 as physical marks or by means of magnetization of the computer readable medium 3000. However, any other suitable embodiment is conceivable as well. Furthermore, it will be appreciated that, although the computer readable medium 3000 is shown in FIG. 14 as an optical disc, the computer readable medium 3000 may be any suitable computer readable medium, such as a hard disk, solid state memory, flash memory, etc., and may be non-recordable or recordable.

Please note that in the above description the measurement point for the BER was right before the Channel Decoding Block 39, see FIG. 4. However the Algorithms 1 and 2 could be applied anywhere between the channel decoding block 39 and after the Rate DeMatching block 35, without modifying the algorithm. Such a modification would bring lower latency. In the case when the Rate DeMatching stage 35 has the repetition factor 0 (puncturing could be done), the measurement point could be even moved at Coded Composite Transport Channel level, see 13 in FIG. 2, and be done on all the data. This would mean a higher estimate accuracy as it would be done on more data. This would equivalent with doing the Measurement at the initial point but on a larger transport channel size.

The invention may also be implemented in a computer program for running on a computer system, at least including code portions for performing steps of a method according to the invention when run on a programmable apparatus, such as a computer system or enabling a programmable apparatus to perform functions of a device or system according to the invention. The computer program may for instance include one or more of: a subroutine, a function, a procedure, an object method, an object implementation, an executable application, an applet, a servlet, a source code, an object code, a shared library/dynamic load library and/or other sequence of instructions designed for execution on a computer system. The computer program may be provided on a data carrier, such as a CD-ROM or diskette, stored with data loadable in a memory of a computer system, the data representing the computer program. The data carrier may further be a data connection, such as a telephone cable or a wireless connection.

In the foregoing specification, the invention has been described with reference to specific examples of embodiments of the invention. It will, however, be evident that various modifications and changes may be made therein without departing from the scope of the invention as set forth in the appended claims. The term "program," as used herein, is defined as a sequence of instructions designed for execution on a computer system. A program, or computer program, may include a subroutine, a function, a procedure, an object method, an object implementation, an executable application, an applet, a servlet, a source code, an object code, a shared library/dynamic load library and/or other sequence of instructions designed for execution on a computer system.

Some of the above embodiments, as applicable, may be implemented using a variety of different information processing systems. For example, although FIG. 1 and the discussion thereof describe an exemplary wireless communication architecture, this exemplary architecture is presented merely to provide a useful reference in discussing various aspects of the invention. Of course, the description of the architecture has been simplified for purposes of discussion, and it is just one of many different types of appropriate architectures that may be used in accordance with the invention. Those skilled in the art will recognize that the boundaries between functional blocks are merely illustrative and that alternative embodiments may merge functional blocks or circuit elements or impose an alternate decomposition of functionality upon various functional blocks or circuit elements.

Thus, it is to be understood that the architectures depicted herein are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the functionality of the above described operations merely illustrative. The functionality of multiple operations may be combined into a single operation, and/or the functionality of a single operation may be distributed in additional operations. Moreover, alternative embodiments may include multiple instances of a particular operation, and the order of operations may be altered in various other embodiments.

Also, the invention is not limited to physical devices or units implemented in non-programmable hardware but can also be applied in programmable devices or units able to perform the desired device functions by operating in accordance with suitable program code. Furthermore, the devices may be physically distributed over a number of apparatuses, while functionally operating as a single device. Also, devices functionally forming separate devices may be integrated in a single physical device. Also, the units and circuits may be suitably combined in one or more semiconductor devices. However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

ABBREVIATIONS

| Term | Meaning |
| --- | --- |
| TrCh | Transport Channel |
| WCDMA | Wideband Code Division Multiple Access |
| BER | Bit Error Rate |
| DPDCH | Dedicated Physical Data Channel |
| DCH | Dedicated Channel |
| SNR | Signal-to-Noise Ratio |
| CCTrCH | Coded Composite Transport Channel |
| UE | User Equipment |
| BPSK | Binary Phase-shift keying |
| QPSK | Quadrature phase-shift keying |
| DL | Downlink |
| UL | Uplink |
| LTE | Long Term Evolution |
| TTI | Transmission Time Interval |

The invention claimed is:

1. A method of estimating a bit error rate in a transport channel (TrCH) of a wireless communication system, the method comprising:
   receiving a signal from a remote transmitter of said wireless communication system via a physical channel (PhCh), said signal comprising data and noise forming a plurality of soft bits;
   selecting between a first estimation method and a second estimation method depending at least one channel parameter, the first estimation method comprising:
   counting, during a period of time, a number of erroneous bits being those soft bits out of said plurality which have an amplitude below −2A or above +2A with A being an average amplitude of the soft bits received; and
   dividing the number of erroneous bits by a number of total bits received via said transport channel during said period of time in order to obtain the bit error rate; and
   the second estimation method comprising:
   determining a noise power estimate of the soft bits received;
   determining a Signal to Noise Ratio (SNR) estimation value using said noise power estimate;
   improving the SNR estimation value by removing a systematic error which was introduced during the SNR estimation determination, to render an improved SNR estimation value; and
   converting the improved SNR estimation value to a bit error rate value based on an analytical relation between the improved SNR estimation value and the bit error rate.

2. A method according to claim 1, wherein said period of time is a time transmission interval (TTI) of said transport channel (TrCH).

3. A method according to claim 1, wherein said second estimation method comprises:
   calculating a Signal to Noise Ratio (SNR) estimation value using the formula:

$$SNRest = \frac{P_{signal}}{P_{noise}} \cong \frac{A^2}{\frac{1}{N}\sum_{i=1}^{N} noise(i)^2} = \frac{NA^2}{\sum_{i=1}^{N} noise(i)^2}$$

with
Psignal a power of the signal, Pnoise the power of the noise
N a number of samples used in the estimation
A an average signal amplitude
noise(i) an ith sample of noise.

4. A method according to claim 1, wherein said at least one channel parameter is a spreading factor (SF) of said physical channel (PhCH).

5. A method according to claim 4, wherein the first estimation method is selected if said spreading factor is smaller than a predefined value.

6. A method according to claim 5, wherein said predetermined value is 32.

7. A method according to claim 1, wherein said at least one channel parameter comprises a transport channel size and a repetition factor of said transport channel.

8. A method according to claim 7, wherein said selection is made depending on whether said transport channel size is smaller than a function of the repetition factor.

9. A method according to claim 1, wherein said selecting comprises accessing a lookup table with as input parameters a repetition factor value and a transport channel size value, to render an output parameter indicating whether the first estimation method or the second estimation method is to be used.

10. A method according to claim 1, wherein said transport channel is an entity of the UMTS(WCDMA) standard.

11. A network node of a wireless communication network, said network node comprising:
   a receiver for receiving a signal from a remote transmitter of said wireless communication system via a physical channel (PhCH), said signal comprising data and noise forming a plurality of soft bits;
   a selection circuit for selecting between a first bit error rate (BER) estimation of a transport channel and a second BER estimation of the transport channel depending at least one channel parameter;
   the first BER estimation uses a counter and a divider,
   the counter for counting, during a period of time, a number of erroneous bits being those soft bits out of said plurality which have an amplitude below −2A or above +2A with A being the average amplitude of the soft bits received; and the divider for dividing the number of erroneous bits by a number of total bits received via said transport channel during said period of time in order to obtain the bit error rate; and the noise power estimation of the received soft bits is determined;

the SNR estimation is determined using the noise power estimation;

the SNR estimation is improved by removing a systematic error which was introduced during determination of the SNR estimation; and the improved SNR estimation is converted to the BER based on an analytical relation between the improved SNR estimation and the BER.

12. A mobile communication device, the device comprising:

a receiver for receiving a signal from a remote transmitter of said wireless communication system via a physical channel (PhCH), said signal comprising data and noise forming a plurality of soft bits;

a selection circuit for selecting between a first bit error rate (BER) estimation of a transport channel and a second BER estimation of the transport channel depending at least one channel parameter;

the first BER estimation uses a counter and a divider, the counter for counting, during a period of time, a number of erroneous bits being those soft bits out of said plurality which have an amplitude below −2A or above +2A with A being the average amplitude of the soft bits received via said physical channel (PhCH); and the divider for dividing the number of erroneous bits by a number of total bits received via said physical channel, during said period of time in order to obtain the bit error rate; and the second BER estimation uses a noise power estimation and a signal to noise ratio (SNR) estimation, the noise power estimation of the received soft bits is determined;

the SNR estimation is determined using the noise power estimation;

the SNR estimation is improved by removing a systematic error which was introduced during determination of the SNR estimation; and the improved SNR estimation is converted to the BER based on an analytical relation between the improved SNR estimation and the BER.

13. A computer program product comprising instructions for causing a processor system to perform a method according to claim 1.

* * * * *